Sept 10, 1957  R. S. HINSEY  2,805,584
MECHANISM CONTROL
Filed July 5, 1952  2 Sheets-Sheet 1
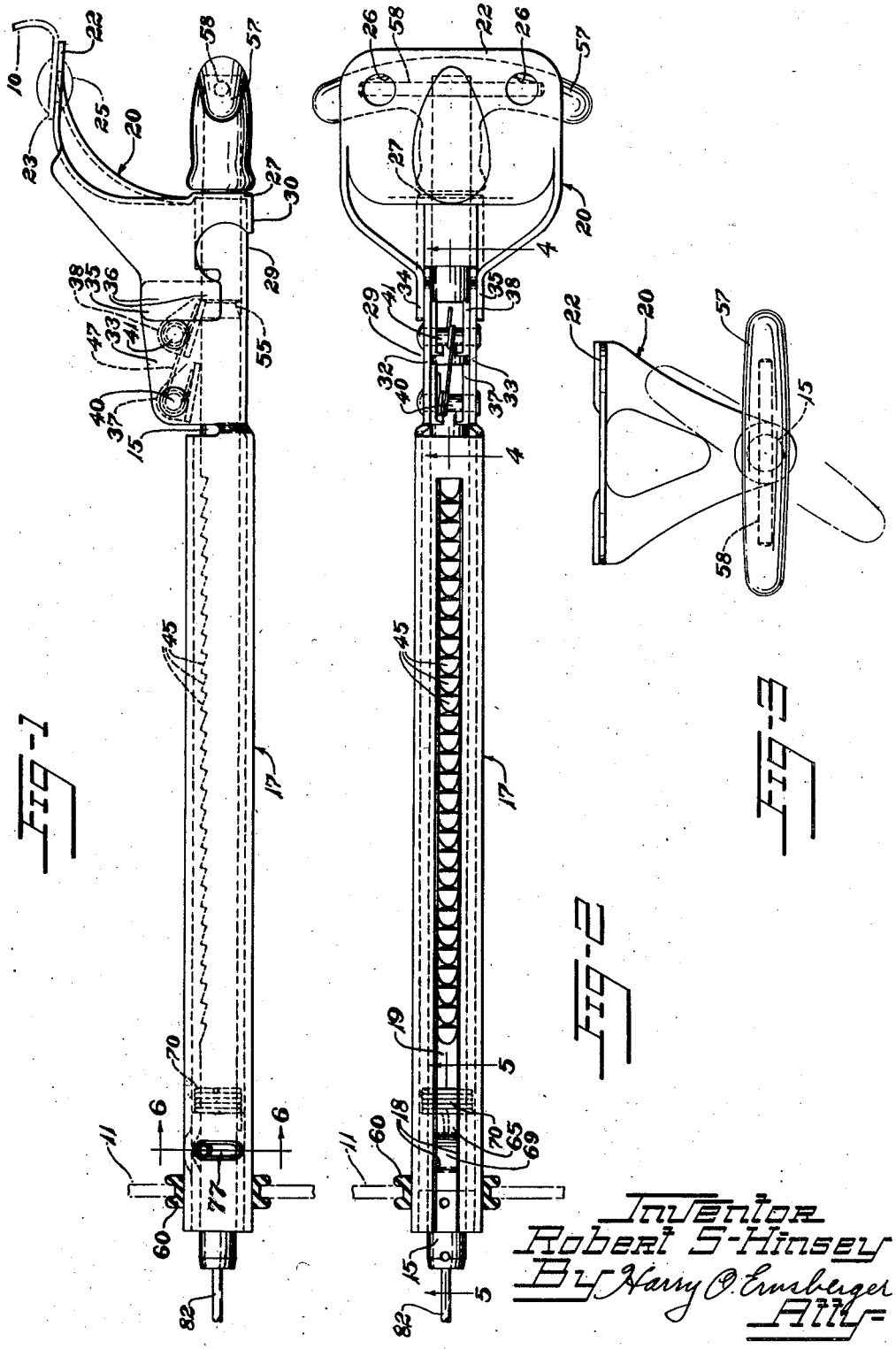

Sept 10, 1957 R. S. HINSEY 2,805,584
MECHANISM CONTROL
Filed July 5, 1952 2 Sheets-Sheet 2
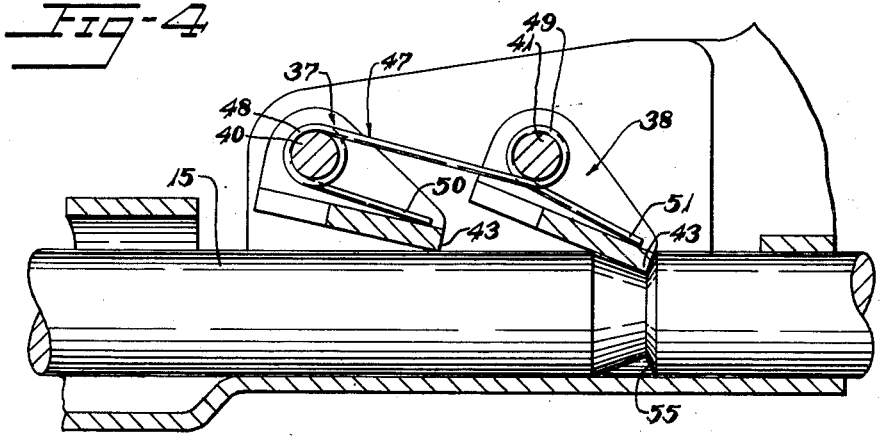
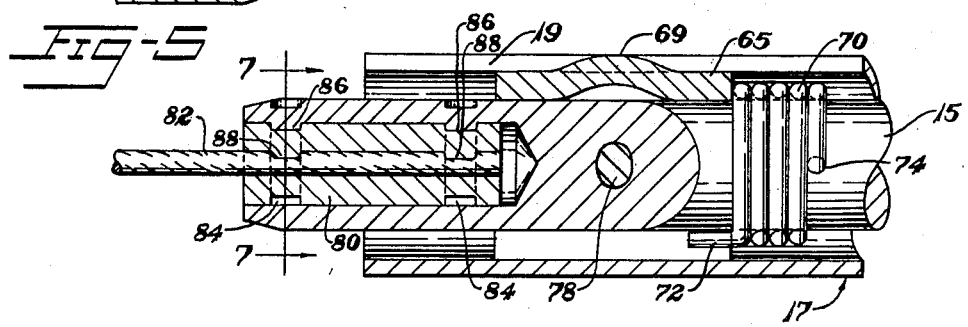
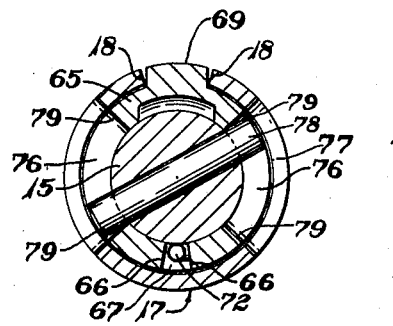 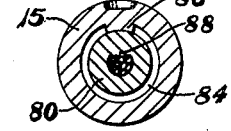 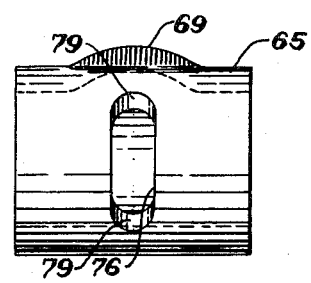
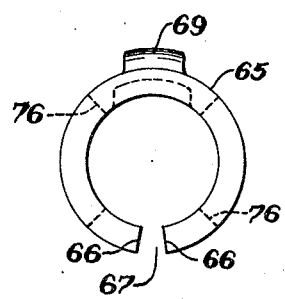
INVENTOR
Robert S. Hinsey
By Harry O. Ernsberger
Atty.

United States Patent Office 2,805,584
Patented Sept. 10, 1957

2,805,584
MECHANISM CONTROL

Robert S. Hinsey, Toledo, Ohio, assignor, by mesne assignments, to The Bingham-Herbrand Corporation, a corporation of Ohio Application July 5, 1952, Serial No. 297,300

3 Claims. (Cl. 74—502)

This invention relates to mechanism control and more especially to an arrangement for actuating or controlling the emergency or parking brakes of a vehicle.

The invention relates to mechanism control embodying a member supported within a tubular guide for movement in a longitudinal direction for actuating mechanism connected thereto, the arrangement including pawl or clutch means for retaining the longitudinally movable member in adjusted positions, the member being arranged for relative limited rotative movement for effecting a release of the pawl or clutch means.

An object of the invention is the provision of a longitudinally movable mechanism-actuating rod or member disposed within a tubular housing or guide means substantially enveloping the rod throughout its length when the rod is in brake-released position, the housing arrangement supporting pawl or clutch members adapted for cooperation with a serrated surface of the rod for holding the latter in adjusted positions.

Another object of the invention resides in a mechanism-control rod arrangement substantially enclosed in a tubularly shaped housing or casing wherein a guide for the rod is integrally formed with the housing at one end thereof, the opposite end of the rod being supported within a sleeve or journal means connected to the rod and adapted for traverse with the rod during longitudinal manipulation of the rod.

Another object of the invention is the provision of a resilient means for biasing a mechanism-control member or rod to a predetermined position of rotation wherein the biasing means is contained within a tubularly shaped housing or support surrounding the rod or member and anchored to a sleeve disposed within the housing.

A further object of the invention resides in an arrangement for connecting or anchoring a flexible cable to a manipulating rod wherein the rod is supported at one end upon a sleeve movable longitudinally with the rod, the arrangement providing for limited angular movements of the connecting cable without material lateral stress being imparted to the sleeve such as would impair or render difficult longitudinal movement of the manipulating rod.

Another object of the invention resides in a simple yet effective means of connecting a force-transmitting cable to a manipulating element.

Still another object is the provision of a pull-type actuating means for actuating or controlling the parking brakes of a vehicle wherein the pull member is contained within a housing or shroud, the elements being configurated and shaped to facilitate rapid assembly thereof.

Still a further object of the invention is the provision of a mechanism-actuating and controlling means wherein the major elements are fabricated of sheet metal to enhance the interchangeability of the elements as well as effect substantial economies in manufacture and assembly.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view illustrating a form of mechanism control of my invention utilized as a vehicle brake-actuating and controlling means;

Figure 2 is a top plan view of the arrangement shown in Figure 1;

Figure 3 is an end elevational view of the arrangement illustrated in Figure 1;

Figure 4 is an enlarged fragmentary detail sectional view taken substantially on the line 4—4 of Figure 2;

Figure 5 is an enlarged detail sectional view taken substantially on the line 5—5 of Figure 2;

Figure 6 is an enlarged transverse sectional view taken substantially on the line 6—6 of Figure 1;

Figure 7 is a sectional view taken substantially on the line 7—7 of Figure 5;

Figure 8 is an enlarged side elevational view of a sleeve forming a component of the combination, and Figure 9 is an end view of the construction shown in Figure 8.

While the mechanism control of the present invention is illustrated as particularly adapted for actuating and controlling the parking or emergency brakes of a vehicle, it is to be understood that the invention may be utilized for controlling other mechanisms wherever the arrangement may be found to have utility.

Referring to the drawings in detail, the embodiment of the invention as illustrated is especially adapted for mounting or installation adjacent the operator's compartment of a vehicle, a portion of the instrument panel of the vehicle being shown at 10 and a portion of the fire wall or dashboard being shown at 11. The manipulating means for the brake mechanism or other mechanism to be controlled includes a member or bar 15 which is contained within a casing or housing 17. While the bar or manipulating member 15 is illustrated as of a solid construction, it is to be understood that it may be fashioned as a tube if desired. The housing 17 may be advantageously made of sheet metal formed to a generally cylindrical shape with the edges 18 spaced to form a longitudinally extending slot 19.

Means are provided adjacent the instrument panel for supporting the housing 17. As particularly shown in Figures 1 through 3, a bracket member 20, preferably formed of sheet metal, is provided with a substantially horizontal ledge portion 22 adapted to be secured to a flange 23 formed as a part of the instrument panel 10 through the medium of rivets 25 passing through openings 26 in the ledge portion 22 which are aligned with openings in the flange 23. It is to be understood that other types of securing means for connecting the bracket 20 to the instrument panel may be employed if desired.

The bracket 20 is fashioned with a depending portion 27 which is formed with an opening through which the rod 15 projects, the housing 17 being formed with a cylindrical portion 29 of reduced diameter forming a bearing support for the rod adjacent the bracket 20. The bracket 20 is formed with a portion 30 which partially surrounds the journal portion 29 of the housing 17 and may be secured to the portion 29 by spot welding if desired.

The housing 17 is formed with upwardly projecting, spaced parallel wall portions 32 and 33 which overlap rearwardly extending portions 34 and 35 of the bracket 20, the overlapping walls being spot welded together as indicated at 36 in order to rigidly connect the housing 17 with the bracket 20. Means is provided, disposed between or carried by the walls 32 and 33 of the housing 17, adapted for cooperation with the manipulating member or bar 15 for retaining the latter in brake-setting or mechanism-actuating position. Positioned within the walls 32 and 33 of the housing 17 are channel-shaped pawls or members 37 and 38, the parallel side wall portions of the pawls being formed with openings to receive journal pins 40 and 41.

The pins may be in the form of rivets having the ends swaged or headed in the conventional manner for permanent assembly with the walls 32 and 33. The pins 40 and 41 provide journal means for pivotally supporting the pawls 37 and 38. The forward edge walls of the bight portions 43 of the pawls are adapted for engagement with the manipulating rod 15, the latter being formed with a rectilinearly arranged serrated formation or group of teeth 45 which are adapted to be engaged by the pawls in order to hold the manipulating rod 15 and mechanism connected thereto in a controlled position.

Spring means is arranged to resiliently bias the pawls into contact with the rod 15. This arrangement is inclusive of a spring 47 formed of tempered wire with two groups of convolutions 48 and 49, a group surrounding each of the pins 40 and 41 as shown in Figures 2 and 4. The end portions 50 and 51 of the spring construction engage the pawls 37 and 38, respectively, the groups of convolutions 48 and 49 being tensioned in a direction so that the portions 50 and 51 exert forces acting upon the pawls in a clockwise direction as viewed in Figures 1 and 4.

The distance between the rod-engaging edge surfaces of portions 43 of the pawls is such that the pawls may selectively engage the teeth 45 on the rod to obtain brake-setting positions equal to one-half the pitch of the teeth 45. By means of this arrangement, a relatively fine adjustment is attained for brake-setting positions of the manipulating means or rod 15. The rod 15 may be formed with an annular recess 55, shown in Figures 1 and 4, cooperating with the pawl 38 to limit the extent of forward movement of the rod when in brake-released position.

The rod 15 may be provided with a suitable manipulating handle 57 which may be of cast metal or plastic material molded at the extremity of the rod 15. In order to establish a permanent connection between the handle and the rod, a pin 58 may be inserted in an opening in the end portion of the rod 15 and the cast or molded material configurated to enclose the pin 58 in the manner shown in Figures 1, 2 and 3.

The forward end of the rod-supporting housing 17 may extend through an opening in the dashboard or fire wall 11, a rubber grommet 60 being preferably disposed in the opening and surrounding the housing 17 to avoid metal-to-metal contact between the housing and the fire wall. Slidably disposed within the tubular formation of the housing 17 is a sleeve 65, preferably formed of sheet metal to an annular shape but with the edges 66 spaced apart to provide a space 67 as shown in Figure 6. The sleeve is mounted for slidable movement within the housing 17 but is restrained against rotation by means of an upwardly extending projection 69 which projects into a space or slot 19 formed between the edges of the housing 17 as shown in Figure 2. The projection 69 may be formed by striking or coining the metal to a ridge formation as shown in Figures 5, 6 and 8.

The external diameter of the sleeve 65 is of a dimension to be readily slidable within the housing 17 and the internal diameter of the sleeve is slightly larger than the diameter of the rod 15 so that the latter may be rotated relative to the sleeve. If desired, the member or sleeve 65 may be made of brass, zinc alloy or other suitable material and may be cast or molded to the proper shape.

Means is provided associated with the sleeve and the rod for normally urging or biasing the rod 15 toward a position aligning the teeth or serrated portion 45 with the pawls or rod-retaining members 37 and 38. As particularly illustrated in Figures 1, 2 and 5, a coil spring 70 surrounds the rod 15, the spring having one extremity 72 extending parallel with the rod and into the space 67 existent between the ends of the member forming the sleeve 65. In this manner one end of the spring is, in effect, anchored to the sleeve 65. The other end portion 74 of the spring 70 extends diametrically of the rod and into an opening formed therein, thus anchoring the end portion 74 to the rod. Rotative movement imparted to the rod 15 and relative to the sleeve 65 exerts force upon the spring 70 which, upon release of the handle 57, causes the rod to be returned to its normal position with the teeth 45 aligned with the pawls 37 and 38.

The rod and sleeve are provided with cooperating means for limiting the extent of relative rotation of the rod. As shown in Figures 6 and 8, the sleeve 65 is formed with radial slots 76 adapted to accommodate the extremities of a pin or abutment 78 which extends through an opening in the rod 15 at right angles to the axis of the rod. The pin 78 is snugly fitted or pressed into the opening in the rod whereby the pin is carried by the rod. The end walls 79 of the slots 76 form limiting means engaged by the pin 78 to determine the extent of rotative movement of the manipulating rod 15 relative to the sleeve 65. A slot 77 is formed on either side of housing 17 to permit pin 78 to be inserted or removed from rod 15.

Figures 5 and 7 illustrate a means of connecting a cable with the manipulating rod 15, the cable being an intermediary element for connecting the rod to the mechanism to be controlled. The end portion of the rod 15 is bored to accommodate a cylindrical member 80 formed of metal, for example, soft steel or the like. The member 80 is provided with a central bore adapted to accommodate the cable or connecting member 82. The anchor member 80 may be provided with annular peripheral recesses 84. A means of permanently connecting the cable 82 to the anchor 80 and the anchor 80 to the rod 15 includes distorting metal of the rod 15 to function as an interlocking medium. As shown in Figures 5 and 7, the metal of the rod 15 is punched or forced inwardly as shown at 86 forming projections extending into the annular recesses 84. The impact of forcing the metal of the rod 15 inwardly to produce projections 86 causes the projections 86 to indent the metal of the anchor 80 in turn forming projections 88 which extend into the cable 82 forming interlocking means for securing the cable to the anchor member 80.

By providing the anchor 80 with annular recesses 84, it is unnecessary during assembly of the rod 15, anchor 80 and cable 82 to position the rod at any particular radial angle during the operation of distorting the rod surface to form the projections 86. Thus to complete an assembly, the anchor member 80 and cable 82 may be telescoped into the bore formed in the end portion of rod 15 and a suitable tool brought into impacting engagement with the exterior of the rod to form the interlocking projections 86 without regard to the radial position of the rod 15 as the projections 86 must enter the recesses 84. By this means a permanent interlocking connection is established between the cable 82 and the sleeve 80 and between the sleeve 80 and the rod 15.

The operation of the mechanism control arrangement utilized in setting and releasing the brakes of an automotive vehicle is as follows: Figures 1, 2 and 4 illustrate the normal position of the manipulating rod 15 fully telescoped within the tubular housing or support 17, viz., the position occupied by the manipulating rod 15 in brake-released position. When it is desired to effect a setting of the brake mechanism, the operator grasps the handle 57 and exerts a rearward pull thereon until the brakes attain a "set" position. As the teeth 45 during such rearward movement of the rod 15 are in alignment with the pawls 37 and 38, the pawls ride over the teeth until the brakes attain a set position. In this position, either pawl 37 or 38 engages the nearest of the teeth 45 and prevents retractive movement of the rod 15. The spring 47 constantly urges the pawls into engagement or contact with the rod 15 so that one of the pawls is in instant position to engage a tooth on the rod 15. During rearward movement of the rod 15 toward brake-setting position, the pin 78 causes the sleeve 65 to move longitudinally with the rod 15 together with the coil spring 70. The coil spring 70 is tensioned to normally bias or maintain the rod in a predetermined position of rotation whereby the teeth 45 are disposed in a position for engagement with the pawls 37 and 38 in any position of longitudinal adjustment of the rod 15.

When it is desired to release the brake mechanism, the operator grasps the handle 57 and rotates the rod 15 through an arcuate distance equal to the extent of movement of the pin 78 within the slots 76 formed in the sleeve 65. The amount of rotative movement thus permitted the rod 15 is sufficient to move the teeth 45 out of aligned relation with the pawls 37 and 38, in which position of rotation the rod may be pushed forwardly without such motion being impeded as the pawls 37 and 38 engage a smooth or unserrated portion of the rod.

The rotative movement which the operator has imparted to the rod 15 in releasing the brakes augments the tension in the coil spring 70 so that when the operator releases his grasp from the handle 57, the force or tension in the coil spring 70 rotates the rod 15 in a reverse direction to is normal position as shown in Figures 1 and 2. As the sleeve 65 is at all times held against rotation through the provision of the ridge or projection 69 extending into the slot 19 in the housing and as the spring 70 has a portion extending into a slot in the sleeve 65, the latter forms an anchor for the spring 70 irrespective of the longitudinal position of the rod 15. While rotative movement of the rod 15 to effect a disengagement of the pawls with the teeth 45 may result in a slight twist in the cable 82, this does not interfere with the operation of the mechanism. As soon as the operator releases his grasp of the handle 57 and the rod 15 moves to its normal position, such temporary twist imparted to the cable 82 is eliminated.

It is apparent that, within the scope of the invention, modifications and different arrangements may be made other than is herein disclosed, and the present disclosure is illustrative merely, the invention, modifications and different arrangements may be made other than is herein disclosed, and the present disclosure is illustrative merely, the invention comprehending all variations thereof.

What I claim is:

1. Mechanism for controlling vehicle brakes including, in combination, a manipulating rod of uniform diameter throughout its length formed with a plurality of longitudinally aligned teeth; means for connecting the rod with the vehicle brake mechanism; a support for said rod formed of sheet metal; said support having portions formed to provide a tubular shape with the edges of the formed portions spaced to provide an elongated slot; pawl means carried by the support and adapted for co-operation with the teeth formed on said rod to hold the rod in brake-setting position; a bearing element formed of sheet metal to substantially cylindrical configuration having its edges spaced to form a longitudinal slot; said bearing element being disposed within the tubular portion of said support and longitudinally slidable therein; a struck up portion formed on a wall of said bearing element and extending into the slot in said support for maintaining said bearing element against rotation; said manipulating rod extending into said bearing element, a circumferential slot formed in a wall of the bearing element, a pin carried by said rod and extending into the slot for limiting rotative movement of the rod, and spring means connected with said rod and extending into the longitudinal slot in said bearing element for normally biasing the rod to one position of rotation.

2. Mechanism for controlling vehicle brakes including, in combination, a manipulating rod of uniform diameter throughout its length formed with a plurality of longitudinally aligned teeth; means for connecting the rod with the vehicle brake mechanism; a support for said rod formed of sheet metal; said support having portions formed to provide a tubular shape with the edges of the formed portions spaced to provide an elongated slot; pawl means carried by the support and adapted for cooperation with the teeth formed on said rod to hold the rod in brake-setting position; a bearing element formed of sheet metal to substantially cylindrical configuration having its edges spaced to form a longitudinal slot; said bearing element being disposed within the tubular portion of said support and longitudinally slideable therein; a struck-up portion formed on a wall of said bearing element and extending into the slot in said support for maintaining said bearing element against rotation; said manipulating rod extending into said bearing element; a circumferential slot formed in a wall of the bearing element, a pin carried by said rod and extending into the slot for limiting rotative movement of the rod, spring means connected with said rod and extending into the slot in said bearing element for normally biasing the rod to one position of rotation, and a second slot in said support at the end of said support adjacent the rod connecting means, said second slot being aligned in its length with the bearing element circumferential slot, in one longitudinal position of said support and said bearing element.

3. Mechanism for controlling vehicle brakes including, in combination, a manipulating rod of uniform diameter throughout its length formed with a plurality of longitudinally aligned teeth; means for connecting the rod with the vehicle brake mechanism; a support for said rod formed of sheet metal; said support having portions formed to provide a tubular shape with the edges of the formed portions spaced to provide an elongated slot; pawl means carried by the support and adapted for cooperation with the teeth formed on said rod to hold the rod in brake-setting position; a bearing element formed of sheet metal to substantially cylindrical configuration having its edges spaced to form a longitudinal slot; said bearing element being disposed within the tubular portion of said support and longitudinally slideable therein; a struck-up portion formed on a wall of said bearing element and extending into the slot in said support for maintaining said bearing element against rotation; said manipulating rod extending into said bearing element, a circumferential slot formed in a wall of the bearing element, a pin carried by said rod and extending into the slot for limiting rotative movement of the rod, spring means connected with said rod and extending into the slot in said bearing element for normally biasing the rod to one position of rotation, said bearing element being adjacent said brake mechanism connecting means, said connecting means including a cable, a cylindrical member having a bore to receive said cable, said rod having a bore at the end adjacent said bearing element to receive the cylindrical member, said member having an annular recess formed therein, a first projection struck into said rod and extending into said recess for locking the cylindrical member to said rod and a second projection struck from said cylindrical member and projecting into said cable for locking said member to said cable, said first and second projections being aligned with one another.

(References on following page)

References Cited in the file of this patent

UNITED STATES PATENTS

| | | |
|---|---|---|
| 734,680 | Dodge | July 28, 1903 |
| 1,643,110 | Briggs | Sept. 20, 1927 |
| 1,660,455 | Plumb | Feb. 28, 1928 |
| 2,030,672 | Winning | Feb. 11, 1936 |
| 2,256,696 | Weber | Sept. 23, 1941 |
| 2,429,224 | Fergueson | Oct. 21, 1947 |
| 2,522,540 | Sandberg | Sept. 19, 1950 |
| 2,608,881 | Sandberg | Sept. 2, 1952 |
| 2,671,353 | Hinsey | Mar. 9, 1954 |
| 2,751,795 | Powell | June 26, 1956 |